Dec. 31, 1963     V. T. KLEIMEYER     3,116,102
TIME CLOCK HAVING CHARGE COMPUTING MEANS

Filed Nov. 14, 1960     6 Sheets-Sheet 1

INVENTOR.
Vernon T. Kleimeyer
BY Wood, Herron & Evans
ATTORNEYS.

Dec. 31, 1963 V. T. KLEIMEYER 3,116,102
TIME CLOCK HAVING CHARGE COMPUTING MEANS
Filed Nov. 14, 1960 6 Sheets-Sheet 3

INVENTOR.
Vernon T. Kleimeyer.
BY
Wood, Herron & Evans.
ATTORNEYS.

INVENTOR.
Vernon T. Kleimeyer
BY
Wood, Herron & Evans.
ATTORNEYS.

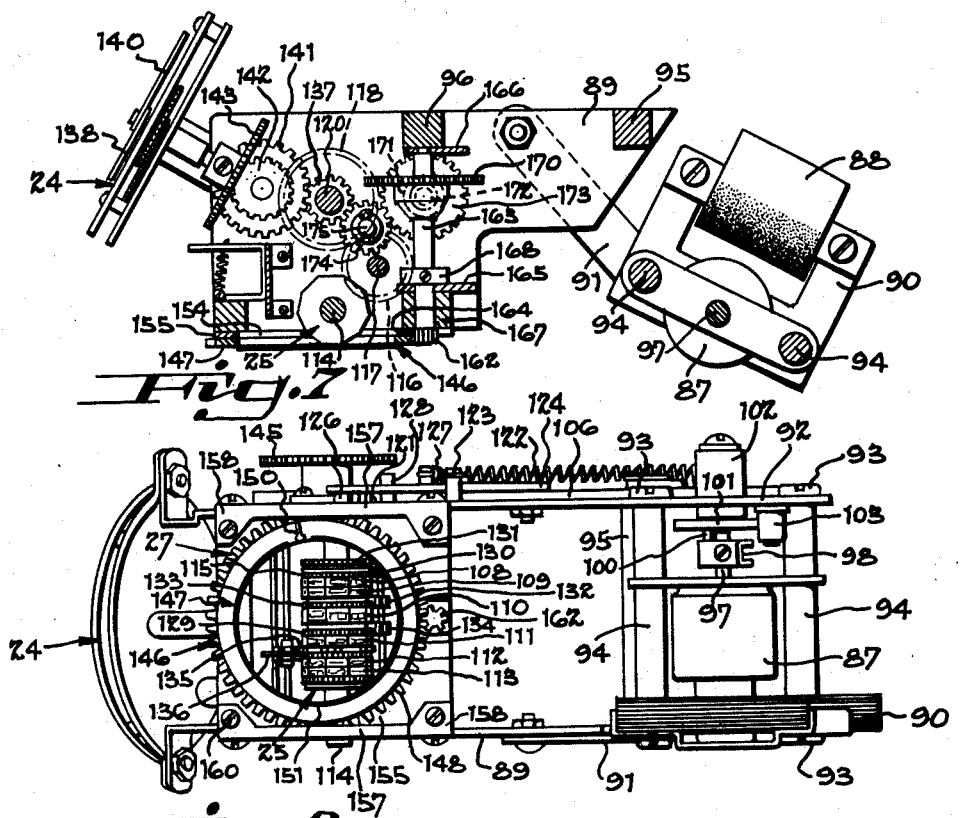
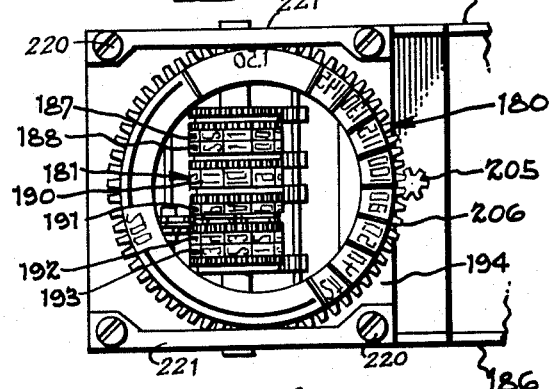

3,116,102
TIME CLOCK HAVING CHARGE COMPUTING MEANS
Vernon T. Kleimeyer, Cincinnati, Ohio, assignor to The Cincinnati Time Recorder Company, Cincinnati, Ohio, a corporation of Ohio
Filed Nov. 14, 1960, Ser. No. 69,076
16 Claims. (Cl. 346—20)

The present invention relates to time clocks and is particularly directed to time clocks of the type adapted to automatically compute and make a printed record of elapsed time related rates, such as parking rates and the like.

At the present time, many garages, parking lots, and other facilities which charge on a time basis still rely upon a simple time stamp which is effective to print in one place the "in" time; i.e., the time when a vehicle enters the garage, and an "out" time; i.e., the time when the vehicle leaves the garage. From these two separately printed times, the attendant mentally computes the elapsed time or storage time and from this computes the amount due under the rate structure used in that particular garage or other installation. The rate formula employed is quite often relatively complicated; for example, a typical formula of charges might by 35¢ for the first hour, 25¢ an hour additional for the next three hours, 25¢ additional for the fourth through eighth hour, 25¢ additional for the eighth through the twelfth hour, and an additional 50¢ for the twelfth through twenty-fourth hour. When computing the amount due in accordance with such a rate schedule, attendants frequently make errors particularly during the rush hours of the day when large numbers of transactions must be carried out in a relatively short period of time. Errors of this type not only can cause losses to the parking lot proprietor, but also tend to cause customer irritation.

A second disadvantage of such systems is that it is extremely tedious to check, or audit, the charges made on the parking ticket to determine that the correct amount has been charged by the attendant and has in turn been reported by the attendant as income for the day.

The principal object of the present invention is to provide time clocks which will automatically compute and print in a readily usable form the amount due for the storage of vehicles between any given "in" and "out" time. The present time clocks are effective to print an easily read indication of the amount no matter how simple or how complex the rate structures of a parking facility happens to be. Moreover, the indication of the amount due is a direct indication which requires no computation whatsoever on the part of the attendant.

In addition, a ticket stamped using the time clocks of the present invention indicates both the exact "in" time and the exact "out" time. This combined printing in one area of a ticket of the "in" time, "out" time, and amount due constitutes a principal advantage of the present invention.

As is explained in detail below, in accordance with the present invention the indication of the total charge is made by means of a mark such as an arrow, or the like, which is printed in conjunction with a printed rate circle. The rate circle is divided into various charge segments; for example, a 35¢ segment, a 60¢ segment, an 85¢ segment, a $1.10 segment, and the like. When the arrow registers with the segment marked "35¢," it indicates that the customer owes 35¢. When the mark registers with the 85¢ segment, it indicates that the customer owes 85¢, and so forth.

While the use of a marker and rate circle alone suffices for most transactions, there are during the period of a day a certain number of transactions where the vehicle is parked almost exactly the length of time coinciding with a rate change. For example, in accordance with the exemplary schedule set forth above, a customer who parked two hours and fifty-nine minutes would owe 85¢ since he had parked just under three hours. However, if the same customer had arrived two minutes earlier, he would have owed $1.10 since he would have been parked just over three hours. In such a situation, the mark appears to lie on the line dividing the 85¢ and $1.10 sectors. Thus, it would be exceedingly difficult, if not impossible, for the attendant to determine to which segment the mark actually points. However, in accordance with the present invention, the correct charge can readily be determined by merely looking at the "in" and "out" times to see whether less than an integral number of hours or more than an integral number of hours has elapsed.

More particularly, the present invention contemplates the provision of a two-clock system for stamping tickets. The first or "in" clock is provided with conventional time wheels for stamping the date, "a.m." or "p.m.," the hours and minutes. This same "in" clock stamps a rate circle having a plurality of segments marked off to correspond to the various rates charged. Thus, the first segment might be marked "35¢"; the second, "60¢"; the third, "85¢"; and so on. In accordance with the present invention, this time circle rotates at a fixed time rate of advancement; for example, one revolution every twenty-four hours. Thus, the radial orientation of the rate circle as it is printed upon a card depends upon the time at which the card has been printed. In the present time stamp, the rate circle surrounds the conventional date and time printing made by the time wheels. Thus, when a car enters a garage and the card is initially printed by the "in" time stamp, two sets of indicia are simultaneously printed. In the first place, the conventional time wheels print in a straight line the date and time while around this straight line is printed a charge circle, the circle having a radial orientation which is dependent upon the time printed.

The second clock of the system, or the "out" clock, includes a printing mechanism substantially identical with that of the "in" clock. Specifically, the "out" clock is provided with conventional time wheels for printing in a straight line the date, "a.m." or "p.m.," the hours and minutes. However, the "out" clock differs from the "in" clock in that the "out" clock includes a card positioning stop effective to position the ticket so that the "out" time line is printed on the card in spaced relation to the "in" time line. Thus, for example, in a preferred system the "out" clock card stop is positioned to engage the leading edge of the card, and is spaced further from the time wheels than the spacing between the card edge and the "in" time. Thus, the wheels of the "out" clock print in a line which is slightly above the line of printing made by the "in" clock. The printing in both instances is, however, made in tranverse alignment within the rate circle on the card. As a result, the time indicated by the "in" clock may be readily subtracted from the time printed by the "out" clock if necessary.

The "out" clock further differs from the "in" clock in that the "out" clock is adapted to imprint an arrow or other indicator mark which registers with or points to one segment of the rate circle. In accordance with the present invention, this marker is rotated in a circle at the same time rate of advancement as the charge circle printer of the "in" clock. The center of this circle is spaced from the card stop the same distance that the center of the rate circle is spaced from the stop in the "out" clock when a printed card is inserted therein. Thus, on the imprinted cards the rate circle and the locus circle of the marker arrow are concentric despite the fact that the conventional time stamp impressions of the "in" and "out" clocks are spaced longitudinally from one another.

The relative orientation of the marker and rate circle is such that when the "in" and "out" clocks indicate the same time, 1:00 p.m. for example, the marker and the zero charge point of the charge circle are in the same angular orientation. In other words, if a card is printed by both clocks at the same time, the marker printed by the "out" clock falls on the zero mark printed by the "in" clock to indicate that no charge is due. It will readily be appreciated that once a card has been printed by the "in" clock, the position of the charge ring is fixed on the card in accordance with the "in" time. If the card is subsequently presented to the "out" clock, six hours later for example, the marker of the "out" clock, which coincided with the zero point of the charge circle at the time of the "in" printing will now have been driven in an arc corresponding to $6/24$ of a circle, or 90 degrees. Thus, when the card is inserted in the "out" clock, the mark printed on the card registers with the segment of the charge circle which is displaced 90 degrees from the zero line. The number appearing on this segment indicates the amount due by the customer. In accordance with the rate schedule in the example described above, this amount would be $1.35.

If the marker should fall on or extremely close to a line dividing two adjacent segments showing different amounts due which occurs if a car has been parked for substantially a number of hours coinciding to a rate change, the attendant can readily ascertain which amount is actually due by merely subtracting the "in" time from the "out" time as these times appear within the rate circle.

One of the principal advantages of the present clock system is that it eliminates both attendant errors and customer complaints. The present clocks make it unnecessary for the attendant to compute charges, since these charges are computed directly by the clocks. At the same time, the customer can see the amount due on his ticket and can thus check to see that he has been charged the correct amount.

An additional advantage of the present clock system is that on those occasions when the time falls right at a rate change, the correct charge can be positively and easily determined by merely comparing the times printed within the rate circle.

A further advantage of the present clock is that it is a simple matter for an auditor to check the totals due for the tickets entered during the day without the need to compute the amount due for each individual ticket.

A still further advantage of the present invention is that both the "in" and "out" clocks require only a minimum number of parts additional to those required by conventional time stamp mechanisms. Consequently, the present system can be produced and sold at a cost not substantially higher than that of individual time stamps.

Another advantage of the present clock construction is that the construction makes it exceedingly easy to adjust the clock to set up any desired rate schedule. In fact, the parking lot proprietor himself, by replacing one part, can readily change his clock whenever he desires to use a different rate schedule.

A still further advantage of the present clock construction is that it is exceedingly versatile. Thus, clocks of the present invention can be utilized with standard parking tickets which are first inserted in an "in" recorder and subsequently in an "out" recorder. Alternatively, the clock mechanism of the present invention can also be used in conjunction with ticket dispensers in which a ticket is automatically severed from a strip, imprinted, and dispensed to the parker.

These and other objects and advantages of the present invention will be more readily understood from a further consideration of the following detailed description of the drawings.

In the drawings:

FIGURE 7 is a cross-sectional view taken along line 7—7 of FIGURE 6.

FIGURE 8 is a bottom view of the upper head unit of the "out" clock.

FIGURE 9 is an enlarged bottom view of the printing head of the "in" clock.

Figure 1:
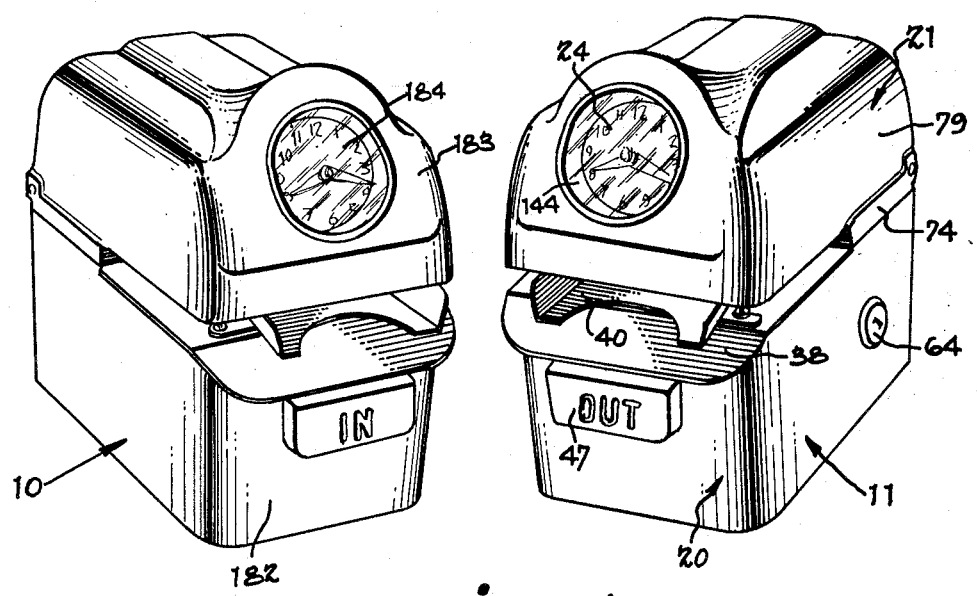
FIGURE 1 is a perspective view showing one preferred form of an "in" clock and an "out" clock embodying the printing mechanism of the present invention.

As shown in FIGURE 1, one preferred embodiment of a time recorder system embodying the principles of the present invention comprises two separate time recorder units, an "in" unit 10 and an "out" unit 11. Each of these units is adapted to receive a standard parking ticket, such as parking ticket 12 shown in FIGURE 2. The "in" recorder 10 is effective to imprint upon ticket 12 the "in" time indicated by way of example "2A 11:54" as is shown in the line of printing numbered 13 in FIGURE 2.

The "in" time recorder is also effective to imprint upon the ticket a charge circle indicated generally at 14. This charge circle comprises a plurality of contiguous segments of a circle, the segments being separated by radial lines 15. The charge circle also includes a zero charge line indicated by 16. This zero line and consequently the entire charge circle rotates at a constant time rate of advancement; for example, one complete revolution every twenty-four hours.

Figure 2:
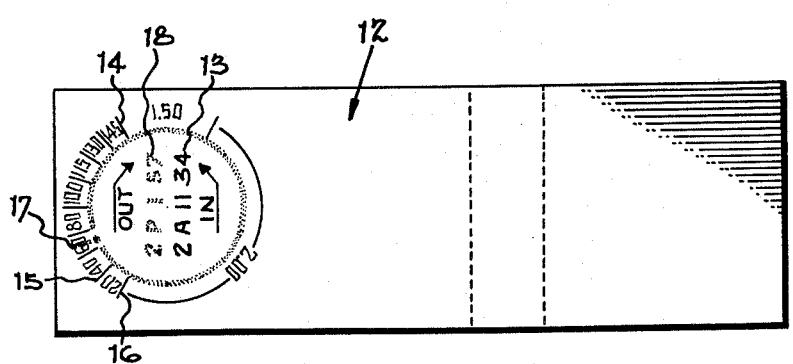
FIGURE 2 is a card bearing both the "in" imprintations and the "out" imprintations of the clocks shown in FIGURE 1.

On the card shown in FIGURE 2, the segments to the right of zero line 16 represent the total charge to be made. The first of these segments is marked "20"; the next segment, "40"; the next segment, "60"; the fourth segment, "80"; and the fifth segment, "1.00." The next three segments are marked "1.15," "1.30" and "1.45" respectively. The next segment is marked "1.60" and the last segment is marked "2.00." It is to be noted that each of the first eight segments occupies fifteen degrees of arc corresponding to one hour of time advancement. However, the $1.60 segment occupies sixty degrees corresponding to four hours of time advancement and the $2.00 segment occupies one hundred and eighty degrees corresponding to twelve hours of time advancement.

The charge circle shown in FIGURE 2 and imprinted by "in" recorder 10 is intended for use by a parking lot or garage having the following rate structure:

| Time in hours: | Charge |
|---|---|
| 0–1 | .20 |
| 1–2 | .40 |
| 2–3 | .60 |
| 3–4 | .80 |
| 4–5 | 1.00 |
| 5–6 | 1.15 |
| 6–7 | 1.30 |
| 7–8 | 1.45 |
| 8–12 | 1.60 |
| 12–24 | 2.00 |

As is explained below, it is a simple matter to set up the "in" recorder 10 to imprint a charge circle corresponding to any desired rate schedule.

When the card 12 is subsequently inserted in the "out" recorder 11 the "out" recorder is effective to imprint a charge mark 17 shown in stippled lines in FIGURE 2. The "out" recorder also imprints the "out" time as indicated by the line "2P 1:57" shown in stippled lines and numbered 18 in FIGURE 2. It is to be noted that both the "in" time, line 13, and "out" time, line 18, are imprinted within the charge circle and are in vertical alignment with one another. Preferably, the "out" time and charge mark are imprinted in a different color from the "in" time and charge circle.

One preferred form of "out" clock 11 is shown in FIGURES 1 and 3–8. As there shown, "out" clock 11 comprises a lower base unit 20 and an upper head unit 21. Lower base unit 20 encloses a printing platen 22, a platen operating solenoid 23 and their associated components; while the upper head unit 21 encloses clock 24, time wheels 25, a time wheel gear advancing train 26 and a charge marker ring 27.

Figure 4:
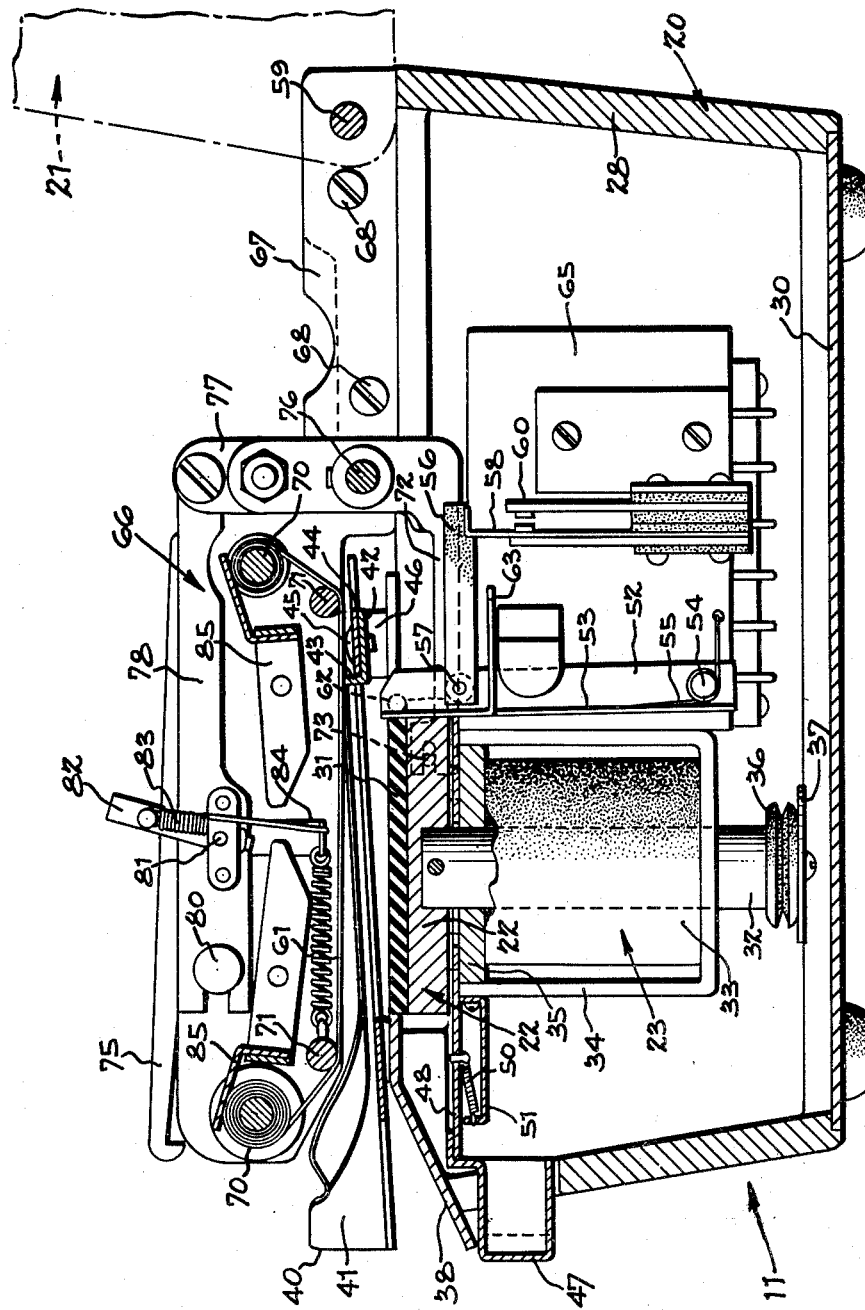
FIGURE 4 is a longitudinal cross-sectional view taken through the center of the base section of the "out" clock and is taken along line 4—4 of FIGURE 3.
Figure 5:
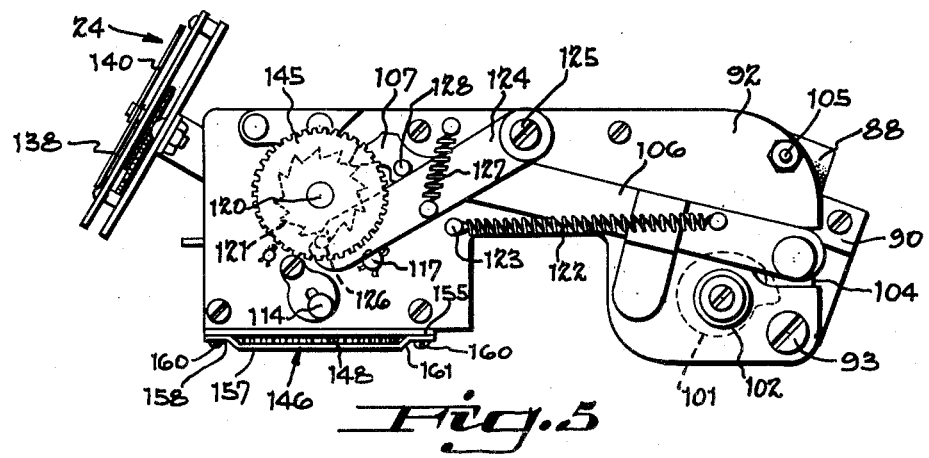
FIGURE 5 is a side elevational view of the upper head of the "out" clock with the housing removed to show certain details of construction.
Figure 6:
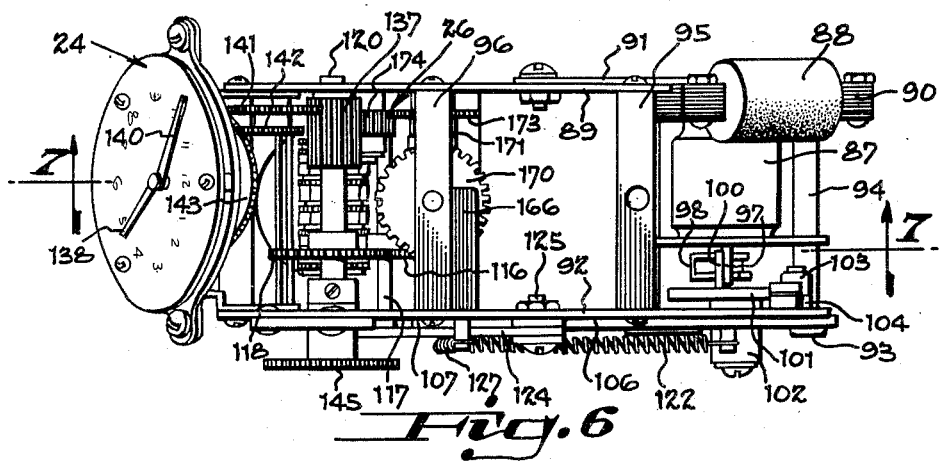
FIGURE 6 is a top plan view of the upper head of the "out" clock with the housing removed to show certain details of construction.

More specifically, as is shown in FIGURE 4, a base unit 20 of "out" unit 11 comprises a cast housing 28 having side and end walls and carrying a bottom closure member 30. The interior walls of housing 28 preferably have cast integral therewith a plurality of bosses or shoulders for supporting various elements of the printing mechanism. The printing mechanism includes a movable platen member 22.

Platen member 22 is a relatively heavy member having a horizontally disposed upper surface to which is adhesively secured a hard rubber pad 31. Platen 22 is pinned or otherwise secured to solenoid armature 32 of solenoid 23. Solenoid 23 also includes a coil 33 which surrounds the armature and is adapted to be energized through suitable electric leads (not shown). Solenoid coil 33 and armature 32 are carried by a yoke 34 and mounting plate 35. Mounting plate 35 extends across the housing 28 and is bolted at its transverse ends to suitable lugs (not shown) provided on the housing. Yoke member 34 depends from plate 35 and is secured to the plate in any suitable manner, such as by means of bolts or the like. Plate 35 and yoke 34 are each provided with a central opening for slidably receiving and guiding armature 32. The lowermost portion of armature 32 carries a compressible rubber washer 36 which is mounted above an end retainer 37 bolted to the end of the armature. This washer is adapted to engage yoke 34 at the limit of upward movement of the armature. The upper surface of rubber pad 31 is disposed in substantial alignment with a plate 38, this plate being bolted or otherwise secured to housing 28 and having a rectangular central opening for permitting upward movement of pad 31 and platen 22.

Mounted above plate 38 is a card guide member 40. This card guide extends longitudinally of the recorder and includes two spaced inwardly opening channels 41 for receiving and guiding the side edges of a time card. The center portion of card guide 40 includes a generally rectangular opening to permit upward movement of pad 31 and platen 22 through the card guide and into contact with the card carried thereby. The innermost edge of the rectangular opening formed in the card guide is defined by a stop member 42.

Stop member 42 includes an upstanding abutment face 43 effective to engage the innermost edge of a card inserted within the guide to limit inward movement of the card. Stop member 42 also includes a horizontal arm 44 which is preferably provided with two longitudinal slots adapted to receive bolts 45 which hold the stop and innermost end of the card guide to a bracket member 46 which in turn is mounted to housing 28. It will readily be appreciated that the elongated slots in the stop member which extend from front to rear of the recorder provide a ready means for adjusting the position in which a card, such as card 12, is held relative to the rubber pad 31 of the printing mechanism during the printing operation.

Bottom housing member 20 also encloses a suitable control mechanism for initiating actuation of printing solenoid 23. As is best shown in FIGURE 4, this control mechanism includes a control bar 47 which protrudes forwardly from the front face of housing 28, the control bar being slidably received in a recess provided in the front face. Control bar 47 is in turn secured in any suitable manner, such as by means of rivets or the like, to a rigid insulated sheet 48. This sheet extends inwardly of plate 35 and is provided with an elongated slot for receiving armature 32 and thereby permitting in and out relative movement of sheet 48. The sheet is spring urged outwardly by means of a spring 50, one end of which is joined to the sheet and the other end of which is carried by a bracket 51 mounted upon yoke 34. The lowermost edge of sheet 48 abuts a pivot bar 52, the lowermost end of this bar being pivotally mounted as at 54 to a vertical support plate 53.

A spring 55 is attached to the support plate and abuts a flange of arm 52 to spring urge the arm in a forward direction (to the left in FIGURE 4). Arm 52 carries, adjacent to its upper end, a switch actuating bar 56. This bar 56 is pivotally mounted to arm 52 as at 57. The inner edge of bar 56 is provided with a notched portion disposed to engage movable switch arm 58. It is to be understood that when switch arm 58 is shifted to the right into contact with stationary arm 60, as in FIGURE 4, a circuit is completed from the power lines to solenoid coil 23. This causes the solenoid to be energized and causes arm 32 to be raised bringing the rubber pad 31 against the undersurface of a card mounted in card guide 40.

It is to be further understood that an ink ribbon 61 is disposed above the upper surface of the card and pad 31 and between the card and time wheels 25 and charge marker ring 27 which are mounted above the ribbon 61 in alignment with the card and pad 31. When the solenoid is shifted upwardly the card is forced against the time wheels and marker ring and an imprintation is made on the card.

In order to insure that the armature is energized for a sufficiently long period to fully advance pad 31, a lock-in arrangement is provided. This arrangement comprises a lug 62 mounted upon the upper end of pivot arm 52. Lug 62 is disposed so that when platen 22 is raised a portion of its complete distance, the edge of the platen engages lug 62. Arm 52 is thus held in its advanced, or clockwise position, in which contact arm 58 engages stationary contact 60. Thus, these contacts are mechanically held closed even though control bar 47 is prematurely released.

Platen 22 also carries a release arm 63. This release arm is disposed beneath bar 56 and includes an arm adapted to engage bar 56 and lift that bar free from contact from switch arm 58 when the platen has substantially reached the upward limit of its movement. When release arm 63 lifts bar 56, contact 58 opens under its own spring force to deenergize the solenoid armature allowing platen 22 and armature 32 to drop downwardly under their own weight. After the platen has returned to its lowermost position, it becomes disengaged from lug 62 permitting arm 52 to pivot in a counterclockwise motion to the position shown in FIGURE 4.

It is to be understood that housing 28 also encloses other components, such as a locking mechanism 64, a terminal block 65, and the like, which constitute no part of the present invention.

The lower housing 28 also carries any suitable type of ribbon feed mechanism, such as mechanism 66, for feeding ribbon 61 across the opening in card guide 40. Essentially, the ribbon feed mechanism comprises two spaced arms 67 which are secured to housing 28 as by means of bolts 68. The arms carry two transverse spools 70 upon which ribbon 61 is wound. Two rods 71 extend between arms 67 to hold the ribbon in position over the card guide 40. Each of the spools 70 carries a ratchet wheel 69. Each of these ratchet wheels is adapted for engagement by a pawl formed on the end of an elongated pivoted lever 75, the lever being actuated by means of a link 72 which in turn engages a pin 73 carried by platen 22. Each time the platen is raised, link 72 is raised to cause pivotal movement of shaft 76 to which the link is attached.

Figure 3:
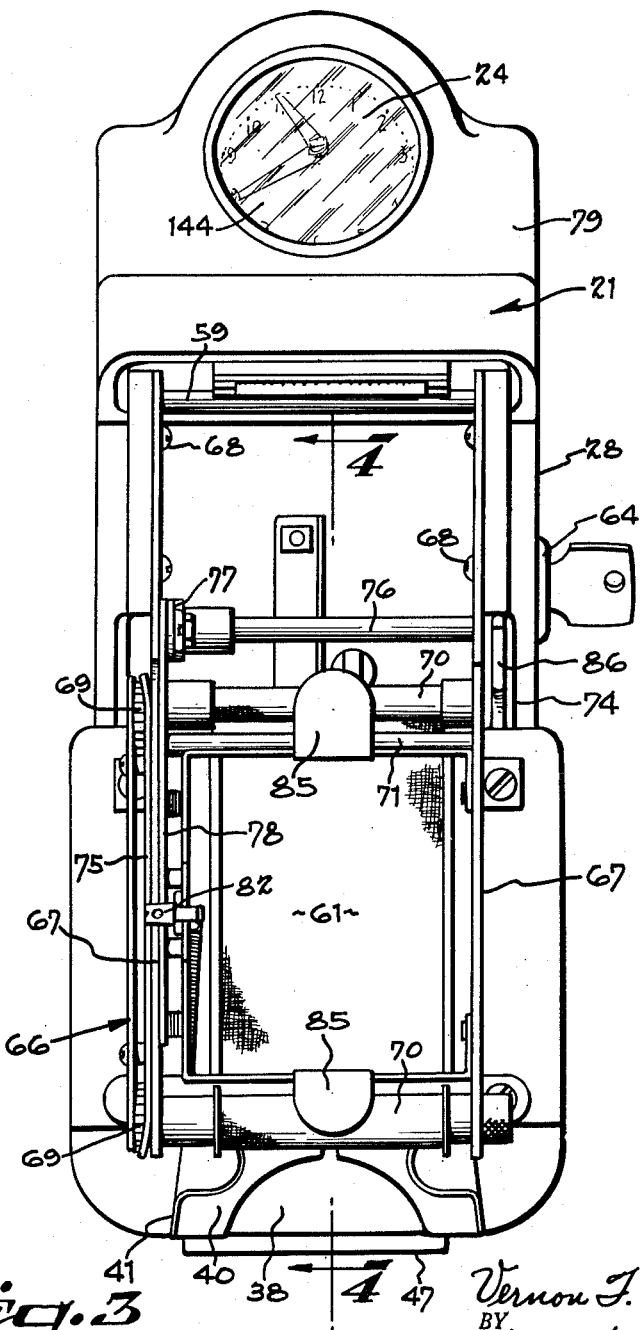
FIGURE 3 is a top plan view of the "out" clock of the present invention showing the head pivoted upwardly away from the printing platen.

Shaft 76 also carries an upstanding arm 77, the upper end of which pivotally carries a link 78. Link 78 is adapted for generally reciprocating movement relative to a pin 80 which supports the free end of the link. A mounting pin 81 is carried by link 78 and this pin rotatably supports lever 75. One end of the lever is spring urged downwardly by means of an over center spring reversing arrangement including an overhanging arm 82 which is mounted upon pivot pin 81 and carries a spring 83 having its opposite end attached to a bracket 84. Overhanging arm 82 has two stable positons, a right-hand position as shown in FIGURE 3, in which the right-hand pawl carried by lever 75 engages the inner ratchet wheel 69, and a left-hand position (not shown) in which the left-hand pawl (as viewed in FIGURE 4) is positioned downwardly to engage the forward or outermost wheel 69.

When the pawl lever 75 is in the position shown in FIGURE 4, the ribbon is fed from front to rear. However, when the pawl lever is tilted the other way and engages the front ratchet wheel the ribbon is fed from rear to front.

Automatic reversal of ribbon advancement is obtained by means of pivotal feeler arms 85 which are pivotally mounted to arms 67. Each of the feeler arms 85 includes a flange in engagement with the peripheral portion of the ribbon wound about one of the spools 70. When the ribbon on one of the spools, for example spool 70, is depleted, feeler arm 85 which is spring urged in a counterclockwise position by a spring (not shown) pivots sufficiently far in a clockwise position that the end of the feeler arm engages the lowermost edge of overhanging arm 82. Thus, when arm 78 is reciprocated, feeler arm 85 engages the lowermost end of arm 82 and limits return or forward movement of that arm so that arm 82 is pivoted about pin 81 in a counterclockwise position and is thereby held in its new position by spring 83. Thus, upon depletion of the ribbon on spool 70, the motion is automatically reversed so that the ribbon begins to wind on opposite spool 70.

Upper head unit 21 in the preferred embodiment includes a housing 79 which is hingedly mounted to the lower base unit 20 by means of a transverse pin 59. In its normal operative position, the upper head is pivoted downwardly to extend parallel to the lower unit as is shown in FIGURE 1. The upper head unit 79 is provided with two longitudinally extending pads 74 which rest upon the upper edges of the side walls of housing 28 as is shown in FIGURE 1. The upper head is held downwardly in its operative position by means of a suitable hook-type latch 86 forming part of locking mechanism 64.

As is best shown in FIGURES 5-8, the housing of upper head unit 21 encloses and supports a synchronous motor 87 having a field winding 88 wound about a core 90. Core 90 is mounted between bracket arm 91 and support plate 89 by means of elongated bolts 93 and spacer sleeves 94. Bracket arm 91 is carried by a second support plate 92. Plates 89 and 92 are in turn secured as by means of bolts 93 to cross bars 95 and 96, the cross bars in turn being bolted or otherwise secured to bosses formed on the top wall of housing 79.

The armature shaft 97 of motor 87 carries a driving yoke 98. This yoke is provided with a radial groove which receives a pin 100 mounted upon a cam 101. Cam 101 is mounted upon a shaft rotatably mounted in boss 102. Cam 101 drives a follower 103 mounted upon a pivot link 104. Link 104 is rotatably supported on a pin 105 (FIGURE 5) carried by side support plate 92. Link 104 is also attached to one end of an arm 106 having a pawl 107 formed on its free end. Cam 101, follower 103, link 104 and arm 106 form part of a time advancement mechanism for advancing the time wheels 25 step-by-step in such a manner that the raised type corresponding to the correct day, "a.m." or "p.m." designation, hour and minute designation is always disposed in the downwardmost position for contact with the card to be printed.

As is best shown in FIGURES 7 and 8, the time wheels comprise a units minute wheel 108, a tens minute wheel 109, hours minute wheel 110, an "a.m." or "p.m." wheel 111, a units day wheel 112, and a tens day wheel 113. Each of these wheels is rotatably mounted upon a main transverse shaft 114. Shaft 114 is in turn carried by the side support plates 89 and 92.

Units minute wheel 108 is driven by a gear 115 which is pivotally mounted upon shaft 114 and is attached to minute wheel 108. Gear 115 in turn meshes with a gear 116 mounted on shaft 117. Gear 116 is in turn driven by a gear 118 mounted upon a cross shaft 20. Cross shaft 120 also carries ratchet wheel 121 adapted for cooperative engagement with the pawl 107 formed on the end of arm 106. Arm 106 is spring urged in the ratchet advancing direction; i.e., to the left in FIGURE 5 by means of a tension spring 122 which is joined to arm 106 and to a pin 123 carried by plate 92.

A stop arm 124 is provided for locking ratchet wheel 121 in place except when that wheel is being advanced by pawl arm 106. Stop arm 124 is pivotally mounted to plate 92 as at 125 and includes a stop finger 126 in engagement with the teeth of ratchet wheel 121. Stop arm 124 is spring urged into engagement with wheel 121 by means of a spring 127. However, the stop arm is forced away from contact with the ratchet wheel by means of a lug 128 carried by pawl arm 106. It will readily be appreciated by those skilled in the art that upon each complete revolution of cam 101 (which revolution requires exactly one minute), pawl arm 106 is retracted and then advanced to cause ratchet wheel 121 to advance one notch. This in turn causes shaft 120 to rotate and causes units wheel 108 to be indexed one-tenth of a revolution each minute.

After the units wheel has advanced ten increments (one complete revolution), the tens wheel 109 is advanced one increment through a conventional transfer mechanism including two transfer teeth rotatable with units minute wheel 108 and adapted to advance transfer pinion 130 and hence gear 131 one step for every complete rotation of wheel 108. Those skilled in the art will readily appreciate that gear 131 is attached to a sleeve which is in turn secured directly to tens minute wheel 109.

In a similar manner, tens wheel 109 has transfer teeth associated with it adapted to advance transfer pinion 132 and hence gear 133 every time the tens minute wheel has made a complete revolution; i.e., once an hour. Gear 133 is in turn directly connected to the hours wheel 110 and hence is effective to cause that wheel to be advanced one increment every time the tens minutes hand makes a complete revolution. In a similar manner, the hours wheel 110 is provided with teeth positioned to engage and advance a transfer gear 134 at every complete revolution of the hours wheel; i.e., every twelve hours. This is in turn effective to drive gear 129 to advance the "a.m."-"p.m." wheel 111 one position every twelve hours. The "a.m."-"p.m." wheel is likewise provided with a series of spaced teeth 135 effective to advance transfer gear 136 one step every twenty-four hours. This gear thus causes the units day wheel 112 to be advanced one increment every twenty-four hours.

The units day wheel likewise has associated therewith two teeth (not shown) to drive through a suitable set of transfer gears, the tens day wheel, so that that wheel is advanced one position every ten days. Since these transfer mechanisms are conventional and are well known to those skilled in the art and constitute no part of the present invention, it is considered unnecessary to describe these mechanisms in greater detail at this time.

In addition to gear 118, which drives the time wheels, shaft 120 also carries a pinion 137. This pinion is effective to drive the hour and minute hands 138 and 140 of clock 24 through gears 141, 142 and 143. As is best shown in FIGURE 1, the hands of clock 24 are plainly visible to the front of the unit through a window 144 provided in upper housing member 79. These hands not only are useful in that they show the correct time, but they also are useful in conjunction with knob 145 in setting the clock. Knob 145 is mounted directly on shaft 120 and rotation of this knob thus causes simultaneous rotation of the hands and advancement of minute hand 108.

In addition to the time wheels 25, the present clock further includes a charge marker mechanism indicated at 146. Specifically, charge marker mechanism 146 includes an annular marker ring 147. This ring is of annular configuration and has gear teeth 148 formed on its periphery. The downward face of the marker ring includes a marker line 150, arrow or the like, which extends downwardly below the surface of the ring and is thus effective, as is explained below, to cause an imprintation upon a card simultaneously with the imprintation made by the time wheels. In the specific embodiment shown, the inner edge of the annular ring also is provided with a circular line marker 151 although it will, of course, be appreciated that this circular marker can be omitted if desired.

Figure 10:
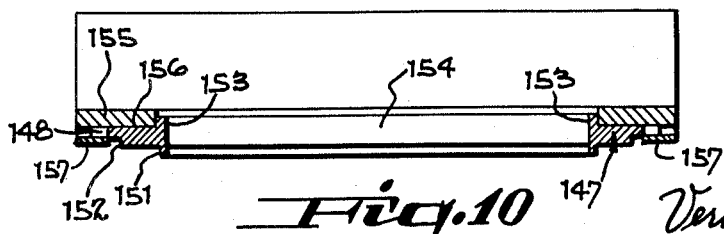
FIGURE 10 is an enlarged cross-sectional view taken through the charge marking ring and its associated supporting components.

As is best shown in FIGURES 8 and 10, gear teeth 148 do not extend the full height of ring 147. Rather, the ring includes an annular shoulder portion 152 of smaller diameter than the gear which extends below gear portion 148 and is interposed between the gear section and marker line 150. Additionally, the upper surface or rear face of the gear is provided with a thin annular hub 153. This hub is rotatably received within a circular opening 154 formed in a mounting plate 155. Mounting plate 155 is bolted or otherwise secured to the lowermost edges of side plates 89 and 92. When ring 147 is assembled with mounting plate 155, the mounting plate engages the rear surface 156 of ring 147, while the annular hub 153 cooperatively engages the walls of opening 154. Ring 147 is held against mounting plate 155 by means of two mounting straps 157. These straps extend parallel to one another along adjacent side edges of mounting plate 155 and engage the front face of gear 148 and the periphery of shoulder 152. Each of the straps 157 includes two feet 158 in abutment with plate 155. These feet are secured to the plate by means of suitable bolts 160.

Each of the straps 157 also includes an offset portion 161 which overlies a portion of the periphery of gear section 148 and tangentially engages shoulder 152. Thus, ring 147 is rotatably supported between plate 155 and straps 157. The lateral position of the ring is determined by the position of opening 154 while the vertical position of the ring is determined by the thickness of plate 155.

The vertical height of marker lines 150 and 151 is preferably substantially the same as that of the type on the time wheels in the lowermost, or printing position. Consequently, when a card is pressed upwardly against the time wheels, the card simultaneously is printed by marker 150 and 151.

As is best shown in FIGURE 8, ring 147 surrounds the time wheels, but is longitudinally offset from the time wheels so that the portion of the wheels in printing position does not lie along a diametral line of the ring, but rather is parallel to a transverse diametral line, but is offset from such a line; in the particular embodiment shown, the offset being toward the inner edge of a card inserted in the card guide.

Gear 148 is driven at the rate of one revolution every twenty-four hours by a gear drive including a pinion 162 mounted upon a vertical shaft 163. Shaft 163 passes upwardly through a recess 164 formed in plate 155. The shaft is rotatably journalled in plates 165 and plates 166, these plates being mounted in any suitable manner upon cross bars 96 and 167 extending between side plates 89 and 92. Vertical shaft 163 carries a collar 168 effective to prevent movement of the shaft in a downward direction. The shaft also carries a gear 170 which meshes with an idler pinion 171 mounted upon a stub shaft 172 carried by side wall 89. Stub shaft 172 also carries a second reduction gear 173 which meshes with a gear 174 carried by a shaft 175 mounted upon wall 89. Gear 174 in turn meshes with pinion 137 mounted upon shaft 120.

It will be recalled that shaft 120 is advanced in a step-by-step movement every minute by the ratchet and pawl combination. This step-by-step movement is transformed into a step-by-step movement of ring 147 through the gear train just described. Thus, marker 151 rotates at a rate of one revolution every twenty-four hours. The marker thus occupies a discrete position for every minute of the day and is shifted through an angular movement of fifteen degrees during each hour.

In the embodiment shown (FIGURES 1 and 9), the "in" unit 10 is substantially identical with "out" unit 11 except that the "in" unit is provided with a charge printing ring 180 instead of a marker ring, such as ring 147, of the "out" unit. Additionally, in "in" unit 10 the position of the marker ring is shifted relative to the time wheels 181 of the "out" unit as compared to the relative position of the time wheels and marker ring of the "out" unit. The third difference between the "in" and "out" units is that in the "in" unit the card stop is spaced a greater distance from the time wheels than the "out" unit.

Figure 11:
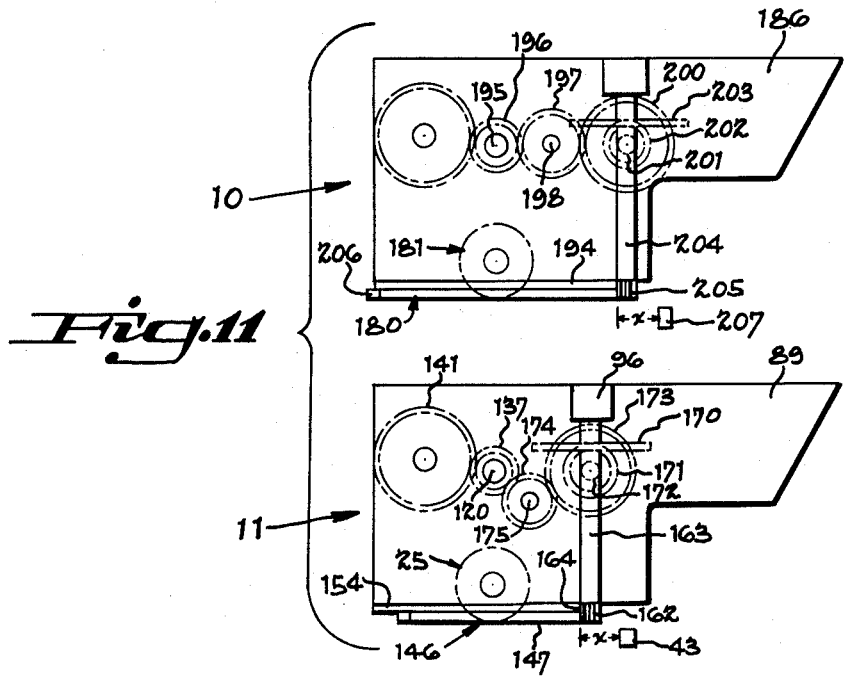
FIGURE 11 is a simplified diagrammatic view showing the relationship between certain parts of the "in" unit and "out" unit.

It is felt that the construction of the "in" unit can best be understood from a consideration of FIGURES 9 and 11. Before referring to those figures in detail, however, it is to be understood in general that the "in" unit comprises a lower base unit 182 and an upper head unit 183. The base unit 182 of the "in" unit is identical with the base unit of the "out" unit described in detail above. Additionally, the head unit of the "in" unit includes a clock 184 which is driven in step-by-step movements from a synchronous motor by a gear train identical with that described in connection with the "out" unit. Moreover, the "in" unit is provided with time wheels 181 which are mounted between spaced supporting plates 185 and 186 in exactly the same manner as are the time wheels in the "out" unit.

Specifically, the time wheels of the "in" unit include a unit minutes wheel 187, a tens minute wheel 188, an hour wheel 190, an "a.m."-"p.m." wheel 191, a units day wheel 192 and a tens day unit wheel 193. Exactly the same transfer arrangement is employed for driving each of these wheels from the minute wheel as was described in connection with the "out" clock.

The "in" clock is also provided with a plate 194 which, in the preferred embodiment, is identical with plate 155 of the "out" unit, but is reversed end for end. That is, plate 155 shown in FIGURE 8 is provided with a circular center opening 154 which is offset from the longitudinal center line of the plate. As is shown in FIGURE 8, the center of circular opening 154 is spaced to the left of center plate 155. In the "in" unit, plate 194 has a circular opening offset from the center line to the plate in the same manner as in plate 154. However, in the "in" unit shown in FIGURE 9, plate 194 is reversed end for end so that the center of the circular opening is disposed to the right of the center plate rather than to the left. The reason for this will be apparent from the description which follows. It is to be understood that the longitudinal alignment of time wheels 181 is exactly the same with respect to the ends of support plates 185 and 186 as is the relationship of time wheels 25 to support plates 89 and 92 in the "out" clock.

FIGURE 11 best shows the difference between the "in" and "out" units. Specifically, the bottom diagram in FIGURE 11 shows the "out" unit. This is a diagrammatic view generally similar to FIGURE 7. It is to be noted in FIGURE 11 that the center of marker ring 147 is to the right of the printing surface, or the axis, of printing wheels 25. It is also to be noted that the stop abutment face 43 is spaced from the adjacent edge of the marker ring 147 by a distance "X." This distance determines the distance between the center of movement of mark 17 and the end of card 12.

The upper portion of FIGURE 11 shows the "in" unit 10. As is there shown, the "in" unit includes a shaft 195 corresponding to shaft 120 of the "out" unit. This transverse shaft 195 carries the ratchet wheels which are driven through a pawl connected to a synchronous motor in exactly the same way as in the "out" unit. Also, the gear drive to the time wheels 181 is taken from a gear provided on shaft 195 in exactly the same manner as in the "out" unit. Shaft 195 also carries a pinion 196 corresponding to pinion 137 of the "out" unit. Pinion 196 drives a gear 197 mounted upon a shaft 198. It is to be noted that shaft 198 is spaced slightly further to the right than the corresponding shaft 175 in the "out unit. Gear 197 in turn drives a gear 200 mounted upon a shaft 201 which is also spaced further to the right than the corresponding shaft "a" in the "out" unit. Shaft 201 also carries a gear 202 effective to drive a pinion 203 mounted upon vertical shaft 204.

It is to be noted that vertical shaft 204 is also spaced to the right from the position of corresponding vertical shaft 163 in the "out" unit. Vertical shaft 204 carries a pinion 205 which meshes with the gear 206 formed on the periphery of the charge marking ring 180. Consequently, ring 180 is driven in synchronism with the time wheels so that charge ring 180 makes one complete revolution every twenty-four hours.

"In" unit 10 also includes a stop 207. It is to be noted that this stop is shifted to the right from the relative position of stop 43 in the "out" unit. It is further to be noted that the stop unit 207 is spaced from the center of the charge ring 180 by the same distance "X" which separates the stop 43 from the center of ring 147. Consequently, when a card 12 is imprinted both with a charge circle 15 by inserting the card in the "in" unit and forcing it against charge ring 180 and then is subsequently imprinted with a charge mark by inserting the card in the "out" unit 11 and forcing the card against marker ring 147, the center of charge circle 15 and the center of movement of charge marker 17 coincide. However, the time line imprinted by time wheels 181 of the "in" unit is longitudinally offset from the time line 18 imprinted by the time wheels 25 of the "out" unit.

In operation, an attendant inserts a card 12 in an "in" clock unit 10 when a customer enters the parking lot, or the like. This unit imprints the charge circle 14 and the "in" time 13. As was explained above, the angular or rotative position of the charge circle changes with the time of day. In a typical operation, it would appear as is shown in FIGURE 2. When the customer returns, the card is imprinted in the "out" unit 11. This causes the "out" time 18 to be printed above the "in" time line 13 and also the charge mark 17 to be printed. In the card shown in FIGURE 2, the mark 17 clearly indicates that the customer owes 60¢.

If, however, the customer had parked his car for almost an even number of hours so that the mark 17 would appear to overlie one of the radial dividing lines 15, the exact charge could be readily ascertained by merely subtracting the time shown in the "in" line from the time shown in the "out" line to determine whether a customer was parked less than or more than an even number of hours.

If, after the present apparatus has been in use, the parking lot proprietor should decide to change his rate structure, his clocks can be easily modified to take care of any new rate formula. Specifically, the "out" clock 11 would not have to be altered in any way. In fact, the only necessary change is the replacement of the charge circle printing ring 180 in the "in" unit with a new ring having differently marked, or spaced, charge segments to correspond with the new rate structure.

The operator, himself, can change rings by merely opening the lock in the "in" unit which corresponds to lock 64 of the "out" unit and pivoting upper head unit 183 upwardly. Bolts 220 holding straps 221 under the charge circle printing ring 180 are then removed and the charge circle printing ring is slipped from engagement with plate 194. A new charge circle printing ring is then inserted in opening in plate 194 and the straps 221 are replaced. Upper head 183 is then pivoted downwardly, and is locked in place, and the "in" unit is ready for further use. This change-over to a new rate structure can be made in a matter of a minute or two and the only tool required is a screw driver.

It is to be understood that the above detailed description merely illustrates one preferred embodiment of the present invention. From this description, those skilled in the art will readily comprehend various modifications to which the invention is susceptible. Thus, by way of example, among the modifications which are clearly contemplated as falling within the scope of the present invention is the use of the head unit of the "in" clock 10 in conjunction with a ticket dispensing unit; i.e., a unit which simultaneously imprints and dispenses a timed ticket rather than a unit of the type shown in the present drawings in which a separate ticket must be imprinted.

One form of ticket dispensing clock is shown in Nutter et al. Patent No. 2,795,875. When incorporating the present "in" unit head in such a ticket dispenser the head is effective to imprint an "in" time line and a charge circle in the same manner as is shown on the ticket in FIGURE 2, and the charge circle is spaced a predetermined distance from the leading edge of the issued ticket. This distance is readily controlled by the ticket feeding and severing mechanism.

In accordance with the present invention, an "in" ticket dispenser provided with time wheels and a charge circle ring is used with an "out" clock similar to "out" clock 11. That is, the "out" clock is provided with a plurality of time wheels driven at a fixed time rate of advancement and an annular marker ring surrounding said time wheels and driven at a fixed time rate of advancement equal to the time rate of advancement of the charge circle ring of the "in" unit. The "out" recorder also includes suitable stop means for locating the card within the "out" recorder so that the marker ring is disposed concentrically with the charge circle. Thus, by way of specific example, an "in" ticket dispenser could be used with "out" clock 11. In this instance, the spacing between the stop 43 in the "out" clock and the center of marker ring 147 is adjusted so that it is equal to the space between the end of the card dispensed by the ticket dispenser and the center of the charge circle. Thus, the circular locus of movement of mark 17 is concentric with the charge circle as in the embodiment shown in FIGURE 1.

Another modification contemplated is the substitution of continental or other time wheels for the hours and minutes wheels shown in the specific embodiment described above. In continental wheels the hours are numbered from zero to twenty-three and the minutes can be expressed either as minutes or as decimal fractions of an hour. In any case, the time wheels are coaxially mounted and gear driven as described above.

Additionally, while the specific embodiment of the present invention has been described largely as it might be used in a parking installation, it will readily be appreciated that apparatus of this type is also useful in many other fields; for example, in connection with various types of rented athletic equipment, such as bowling lanes, trampoline pits, and the like. When the present apparatus is used in such an installation where the normal elapsed time is relatively small, it is frequently desirable to rotate the charge ring and marker ring at a higher rate of speed so that for example they complete a revolution every four hours.

Still other rates of speed for these units are desirable for specific uses of the apparatus. For example, in an elapsed time recorder it is at times desirable to have the elapsed time ring rotated at a speed of one revolution every eight hours. For certain parking facilities it is desirable to have the time rate of advancement of the charge circle ring and marker ring such that the rings complete one revolution every twelve hours. For still other installations, for example airport parking installations, where the elapsed time is of a longer order it is desirable to have the charge circle ring and marker ring rotate at a slower speed, for example, one revolution every six days. In any event, the desired rate of advancement of these rings can readily be obtained by the use of the proper gear drive.

A still further modification of the present invention involves the use of the present clocks as an elapsed time recorder rather than as a charge computer. Specifically, in many manufacturing operations it is desirable to know the length of time required to perform a particular operation, such as a turning operation, or the like. The present clock system is also especially adapted to the task of automatically computing and printing elapsed time. All that is required is that the charge ring 180 in "in" unit 10 be replaced with an elapsed time ring effective to imprint an elapsed time circle 210 shown on card 211 of FIGURE 12. This circle is divided by a plurality of radial lines into hours and tenths of an hour. The "in" unit of such a system prints both an elapsed time circle and an "in" time line 212 in the same manner that the "in" unit described above imprints an "in" time line and a charge circle.

Figure 12:
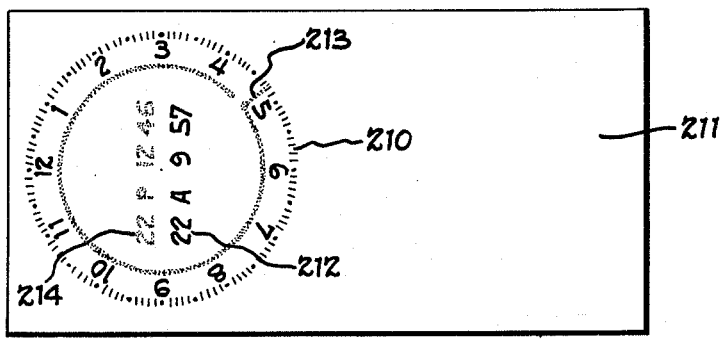
FIGURE 12 shows an "elapsed time" card produced by a modification of the present clocks.

In an elapsed time recording system there is also used an "out" unit similar to unit 11 having a marker ring effective to make an elapsed time mark 213 and to imprint a finish time line 214 as is shown in FIGURE 12. The construction and operation of the units for computing elapsed time are otherwise identical with those described above.

The advantage of an elapsed time card printed by the present apparatus is that by looking at the position of the marker relative to the elapsed time ring, the elapsed time can be read directly and need not be computed. Thus, by looking at the card shown in FIGURE 12, it can quickly be determined that the particular operation involved took approximately 4.8 hours. Thus, the elapsed time can be quickly determined without the possibility of errors introduced in the subtraction of the start and stop times. However, these times are imprinted within the elapsed time circle in the event that for some particular operation it is necessary to have an absolutely exact time computation. The time lines also confirm the time and date when both the "in" and "out" registrations are made.

Those skilled in the art will readily comprehend various other modifications of the present invention. Accordingly, I wish to be limited only by the scope of the following claims.

Having described my invention, I claim:

1. Apparatus for computing and recording a total charge dependent in a predetermined manner upon elapsed time, said apparatus comprising an "in" recorder and an "out" recorder, said "in" recorder having a plurality of rotatable time wheels and a rotatable annular ring surrounding said time wheels, said ring having raised indicia thereon for delineating a plurality of arcuate segments and charges associated with each of said segments, means for advancing said time wheels at a predetermined time rate of advancement, means for effecting rotating movement of said ring at a predetermined time rate of advancement, card receiving means, and a stop member disposed for engagement with a card for positioning said card in a predetermined position relative to said annular ring, and means for forcing said card into printing contact with said time wheels and said annular ring, whereby said card is imprinted with an "in" time line by said time wheels and is imprinted with a charge circle by said annular ring, said "out" recorder comprising a plurality of rotatable time wheels and a rotatable annular ring surrounding said time wheels, the position of said annular ring relative to said time wheels being offset from the corresponding position of said ring and said time wheels in the "in" recorder, the annular ring in said "out" recorder having a marker forming indicia thereon, means for advancing said time wheels at a predetermined time rate of advancement, means for effecting rotating movement of said ring at a predetermined time rate of advancement, card receiving means, and a stop member disposed for engagement with a card for positioning said card in the same predetermined position relative to said annular ring as said card was positioned relative to the annular ring in said "in" recorder, and means for forcing said card into contact with said time wheels and said annular ring, whereby said card is imprinted with an "out" time line by said time wheels and is imprinted with a charge mark by said annular ring.

2. Apparatus for computing and recording a total charge dependent in a predetermined manner upon elapsed time, said apparatus comprising an "in" recorder and an "out" recorder, said "in" recorder having a plurality of time wheels rotatable on a common axis and a rotatable annular printing ring surrounding said time wheels, the axis of said time wheels being spaced from a diameter of said ring, said ring having raised indicia thereon for delineating a plurality of arcuate segments and charges associated with each of said segments, means for advancing said time wheels at a predetermined time rate of advancement, means for effecting rotating movement of said ring at a predetermined time rate of advancement, card receiving means, a stop member disposed for engagement with a card for positioning said card in a predetermined position relative to said annular ring, means for forcing said card into printing contact with said time wheels and said annular ring, whereby said card is imprinted with an "in" time line by said time wheels and is imprinted with a charge circle by said annular ring, said "out" recorder comprising a plurality of time wheels rotatable on a common axis, a rotatable annular ring surrounding said time wheels, the position of said annular ring relative to said time wheels being offset from the corresponding position of said ring and said time wheels in the "in" recorder, the annular ring in said "out" recorder having a generally radial marker forming indicia thereon, means for advancing said time wheels at a predetermined time rate of advancement, means for effecting rotating movement of said ring at a predetermined time rate of advancement, card receiving means, a stop member disposed for engagement with a card for positioning said card in the same predetermined position relative to said annular ring as said card was positioned relative to the annular ring in said "in" recorder, and means for forcing said card into contact with said time wheels and said annular ring, whereby said card is imprinted with an "out" time line spaced from the "in" time line by said time wheels, and is imprinted with a charge marker by said annular ring.

3. Apparatus for computing and recording a total charge dependent in a predetermined manner upon elapsed time, said apparatus comprising an "in" recorder and an "out" recorder, said "in" recorder having a plurality of coaxially rotatable time wheels and a rotatable annular ring surrounding said time wheels, said ring having raised indicia thereon for delineating a plurality of arcuate segments and charges associated with each of said segments, means including a synchronous motor and a gear train for advancing said time wheels at a predetermined time rate of advancement, gear means driven by said motor for effecting rotating movement of said ring whereby said ring completes one revolution each twenty-four hours, card receiving means, and a stop member disposed for engagement with a card for positioning said card in a predetermined position relative to said annular ring, and means for forcing said card into printing contact with said time wheels and said annular ring, whereby said card is imprinted with an "in" time line by said time wheels and is imprinted with a charge circle surrounding said "in" time line by said annular ring, said "out" recorder comprising a plurality of coaxially rotatable time wheels, a rotatable annular ring surrounding said time wheels, the position of said annular ring relative to said time wheels being offset from the corresponding position of said ring and said time wheels in the "in" recorder, the annular ring in said "out" recorder having a mark forming indicia thereon, means including a synchronous motor and a gear train for advancing said time wheels at a predetermined time rate of advancement, gear means driven by said motor for effecting rotating movement of said ring at the same rate of advancement as the ring of said "in" recorder, card receiving means, and a stop member disposed for engagement with a card for positioning said card in the same predetermined position relative to said annular ring as said card was positioned relative to the annular ring in said "in" recorder, and means for forcing said card into printing contact with said time wheels and said annular ring, whereby said card is imprinted with an "out" time line by said time wheels and is imprinted with a charge marker by said annular ring.

4. Apparatus for computing and recording elapsed time, said apparatus comprising an "in" recorder and an "out" recorder, said "in" recorder having a plurality of rotatable time wheels and a rotatable annular printing ring surrounding said time wheels, said ring having raised indicia thereon for delineating elapsed time along the periphery of a circle, means for advancing said time wheels at a predetermined time rate of advancement, means for effecting rotating movement of said ring at a predetermined time rate of advancement, card receiving means, and a stop member disposed for engagement with a card for positioning said card in a predetermined position relative to said annular ring, and means for forcing said card into printing contact with said time wheels and said annular ring, whereby said card is imprinted with an "in" time line by said time wheels and is imprinted with an elapsed time circle by said annular ring, said "out" recorder comprising a plurality of rotatable time wheels, and an annular ring surrounding said time wheels, the position of said annular ring relative to said time wheels being offset from the corresponding position of said ring and said time wheels in the "in" recorder, the annular ring in said "out" recorder having a mark forming indicia thereon, means for advancing said time wheels at a predetermined time rate of advancement, means for effecting rotating movement of said ring at a predetermined time rate of advancement, card receiving means and a stop member disposed for engagement with a card for positioning said card in the same predetermined position relative to said annular ring as said card was positioned relative to the annular ring in said "in" recorder, and means for forcing said card into printing contact with said time wheels and said annular ring, whereby said card is imprinted with an "out" time line by said time wheels and is imprinted with a mark by said annular ring.

5. Apparatus for computing and recording a total charge dependent in a predetermined manner upon elapsed time, said apparatus comprising an "in" recorder unit and an "out" recorder unit, said "in" recorder unit including a plurality of rotatable time wheels and a rotatable annular ring surrounding said time wheels, said ring having raised indicia thereon for delineating a plurality of arcuate segments and charges associated with said segments, means including a motor for advancing said time wheels at a predetermined rate of advancement, means driven from said motor for effecting rotating movement of said ring at a predetermined time rate of advancement, and means for effecting printing contact between a ticket and said time wheels and said annular ring, whereby said ticket is simultaneously imprinted with an "in" time line by said time wheels and is imprinted with a charge circle by said annular ring, said charge circle being located a predetermined position upon said ticket, said "out" recorder comprising a plurality of rotatable time wheels and a rotatable annular ring surrounding said time wheels, the position of said annular ring relative to said time wheels being offset from the corresponding position of said ring and time wheels in the "in" recorder, the annular ring in said "out" recorder having a mark forming indicia thereon, means including a motor for advancing said time wheels at a predetermined time rate of advancement, gear means driven by said motor for effecting rotating movement of said ring at the same time rate of advancement as the ring in said "in" recorder, a stop member for engagement with a ticket for positioning said ticket relative to said annular ring so that said annular ring is disposed concentrically with the charge circle, and means for forcing said ticket into contact with said time wheels and said annular ring, whereby said ticket is simultaneously imprinted with an "out" time line by said time wheels and is imprinted with a charge mark by said annular ring.

6. Apparatus for computing and recording a total charge dependent in a predetermined manner upon elapsed time, said apparatus comprising an "in" recorder unit and an "out" recorder unit, said "in" recorder unit including a plurality of rotatable time wheels and a rotatable annular ring surrounding said time wheels, said ring having raised indicia thereon for delineating a plurality of arcuate segments and charges associated with said segments, means for advancing said time wheels at a predetermined rate of advancement, means for effecting rotating movement of said ring at a predetermined time rate of advancement, and means for effecting printing contact between a ticket and said time wheels and said annular ring, whereby said card is imprinted with an "in" time line by said time wheels and is imprinted with a charge circle by said annular ring, said charge circle being located a predetermined position upon said card, said "out" recorder comprising a plurality of rotatable time wheels and a rotatable annular ring surrounding said time wheels, the position of said annular ring relative to said time wheels being offset from the corresponding position of said ring and said time wheels in the "in" recorder, the annular ring in said "out" recorder having a marker forming indicia thereon, means for advancing said time wheels at a predetermined time rate of advancement, means for effecting rotating movement of said ring at a predetermined time rate of advancement, a stop member for engagement with a ticket for positioning said ticket relative to said annular ring so that said annular ring is disposed concentrically with the charge circle, and means for forcing said ticket into contact with said time wheels and said annular ring, whereby said ticket is imprinted with an "out" time line by said time wheels and is imprinted with a charge mark by said annular ring.

7. Apparatus for computing and recording elapsed time, said apparatus comprising an "in" recorder unit and an "out" recorder unit, said "in" recorder unit including a plurality of rotatable time wheels and a rotatable annular ring surrounding said time wheels, said ring having raised indicia thereon for delineating an elapsed time circle, means for advancing said time wheels at a predetermined time rate of advancement, means for effecting rotating movement of said ring at a predetermined time rate of advancement, means for effecting printing contact between a ticket and said time wheels and said annular ring, whereby said card is imprinted with an "in" time line by said time wheels and is imprinted with an elapsed time circle by said annular ring, said elapsed time circle being located at a predetermined position upon said ticket, said "out" recorder comprising a plurality of rotatable time wheels, an annular ring surrounding said time wheels, the position of said annular ring relative to said time wheels being offset from the corresponding position of said ring and said time wheels in the "in" recorder, the annular ring in said "out" recorder having a mark forming indicia thereon, means for advancing said time wheels at a predetermined time rate of advancement, means for effecting rotating movement of said ring at a predetermined time of advancement, a stop member for engagement with a ticket for positioning said ticket relative to said annular ring so that said annular ring is disposed concentrically with the elapsed time circle, and means for forcing said ticket into printing contact with said time wheels and said annular ring, whereby said ticket is imprinted with an "out" time line by said time wheels and is imprinted with a mark by said annular ring.

8. Apparatus for computing and recording a total charge dependent in a predetermined manner upon elapsed time, said apparatus comprising an "in" recorder unit and an "out" recorder unit, said "in" recorder unit including a plurality of rotatable time wheels and a rotatable annular ring surrounding said time wheels, said time wheels being offset from a diameter of said ring, said ring having raised indicia thereon for delineating a plurality of arcuate segments and charges associated with said segments, means including a synchronous motor for advancing said time wheels at a predetermined time rate of advancement, means including said motor for effecting rotating movement of said ring at a predetermined time rate of advancement, and means for effecting printing contact between a ticket and said time wheels and said annular ring, whereby said card is imprinted with an "in" time line by said time wheels and is imprinted with a charge circle by said annular ring, said charge circle being located a predetermined position upon said card, said "out" recorder comprising a plurality of rotatable time wheels and an annular ring surrounding said time wheels, the annular ring relative to said time wheels being positioned so that said time wheels are offset on the opposite side of the diameter of said annular ring from the corresponding position of said time wheels and said ring in the "in" recorder, the annular ring in said "out" recorder having a mark forming indicia thereon, means for advancing said time wheels at a predetermined time rate of advancement, means for effecting rotating movement of said ring at a predetermined time of advancement, a stop member for engagement with a ticket for positioning said ticket relative to said annular ring so that said annular ring is disposed concentrically with the charge circle, and means for forcing said ticket into printing contact with said time wheels and said annular ring, whereby said ticket is imprinted with an "out" time line by said time wheels and is imprinted with a charge mark by said annular ring.

9. A time stamp for use in a system for computing and recording a total charge dependent in a predetermined manner upon elapsed time, said time stamp comprising a transverse shaft, a plurality of rotatable time wheels, means rotatably mounting said time wheels in coaxial side-by-side relationship on said transverse shaft, an annular printing ring, means rotatably supporting said annular ring surrounding said time wheels, said annular ring having raised printing indicia formed on one surface thereof, the printing surface of said ring and the printing surface of said wheels being disposed in substantially the same horizontal plane, means for advancing said time wheels step by step at a predetermined time rate of advancement, means for effecting step by step rotating movement of said ring at a predetermined time rate of advancement, card receiving means, a stop member disposed for engagement with a card for positioning said card in a predetermined position relative to said annular ring, and means for forcing said card into contact with said time wheels and said annular ring, said rotatable time wheels being effective to imprint date, hour and minute indicia in a transverse line parallel to said shaft.

10. A time stamp for use in a system for computing and recording elapsed time, said time stamp comprising a plurality of rotatable time wheels, a transverse shaft, means rotatably mounting said time wheels in coaxial side-by-side relationship on said shaft, an annular printing ring, means rotatably supporting said annular printing ring surrounding said time wheels, said annular ring having raised printing indicia formed on one surface thereof, the printing surface of said ring and the printing surface of said wheels being in substantial vertical alignment, means for advancing said time wheels step by step at a predetermined time rate of advancement, and means for effecting step by step rotating movement of said ring at a predetermined time rate of advancement, card receiving means, a stop member disposed for engagement with a card for positioning said card in a predetermined position relative to said annular ring, and means for forcing said card into printing contact with said time wheels and said annular ring, said rotatable time wheels being effective to imprint date, hour and minute indicia in a transverse line parallel to said shaft.

11. A time stamp for use in a system for computing and recording a total charge depending in a predetermined manner upon elapsed time, said time stamp comprising transversely extending shaft means, a plurality of rotatable time wheels, means rotatably mounting said time wheels in coaxial side-by-side relationship on said shaft means, an annular printing ring having an annular hub extending from one surface thereof, means rotatably journaling said annular hub with said ring surrounding said time wheels, said annular ring having raised printing indicia formed on one surface thereof, a gear portion formed on the outer periphery of said ring, the printing surface of said ring and the printing surface of said wheels being in substantial vertical alignment, means for advancing said time wheels step by step at a predetermined time rate of advancement, and means for driving said gear portion for effecting step by step rotating movement of said ring at a predetermined time rate of advancement, card receiving means, a stop member disposed for engagement with a card for positioning said card in a predetermined position relative to said annular ring, and means for forcing said card into printing contact with said time wheels and said annular ring, said rotatable time wheels being effective to imprint date, hour and minute indicia in a transverse line parallel to said shaft means.

12. A time stamp for use in a system for computing and recording a total charge dependent in a predetermined manner upon elapsed time, said time stamp comprising a plurality of rotatable time wheels, transverse shaft means rotatably mounting said time wheels in coaxial side-by-side relationship, an annular printing ring having an annular hub on the rear face thereof, means engaging the exterior of said annular hub for rotatably supporting said annular hub, said hub surrounding said time wheels, said annular ring having an upstanding shoulder extending outwardly from the face opposite said hub, raised printing indicia formed on one surface of said annular shoulder, said ring having a gear portion extending outwardly beyond said shoulder, means in engagement with said gear for supporting said ring with the printing surface of said ring and the printing surface of said wheels in substantial vertical alignment, means for advancing said time wheels step by step at a predetermined rate of advancement, and means for effecting step by step rotating movement of said ring at a predetermined time rate of advancement, card receiving means, a stop member disposed for engagement with a card for positioning said card in a predetermined position relative to said annular ring, and means for forcing said card into printing contact with said time wheels and said annular ring, said rotatable time wheels being effective to imprint date, hour and minute indicia in a transverse line relative to said stop member, said line being parallel to said shaft means.

13. A time stamp for use in a system for computing and recording a total charge dependent in a predetermined manner upon elapsed time, said time stamp comprising a plurality of rotatable time wheels, means rotatably mounting said time wheels in coaxial side-by-side relationship, an annular printing ring having an annular hub on the rear face thereof, means engaging the exterior of said annular hub for rotatably supporting said annular hub, said hub surrounding said time wheels, said annular ring having an upstanding shoulder extending outwardly from the face opposite said hub, raised printing indicia formed on one surface of said annular shoulder, said ring having a gear portion extending outwardly beyond said shoulder, means in engagement with said gear for supporting said ring with the printing surface of said ring and the printing surface of said wheels in substantial vertical alignment, means for advancing said time wheels at a predetermined time rate of advancement, said means comprising a synchronous motor, a ratchet and pawl drive actuated by said motor and gears interconnecting said pawl and said time wheels, and means for effecting rotating movement of said ring at a predetermined time rate of advancement, said means comprising a gear train interconnecting said pawl and said gear on said ring, and means for forcing said card into contact with said time wheels and said annular ring, a stop member disposed for engagement with a card for positioning said card in a predetermined position relative to said annular ring, and means for forcing said card into printing contact with said time wheels and said annular ring, said rotatable time wheels being effective to imprint date, hour and minute indicia in a transverse line relative to said stop member.

14. In an apparatus for use in computing and recording a total charge dependent in a predetermined manner upon elapsed time, the improvement which comprises a printing head comprising a frame, a transverse shaft carried by said frame, a plurality of rotatable time wheels mounted in side-by-side relationship upon said shaft, said rotatable time wheels being effective to imprint date, hour and minute indicia on a transverse line parallel to said transverse shaft, an annular ring, said annular ring having an annular hub extending from one surface thereof, means engaging the exterior of said annular hub for rotatably supporting said hub with said annular ring surrounding said time wheels, said ring having raised printing indicia formed thereon on a surface opposite said hub, said indicia and time printing indicia of said time wheels being in substantial vertical alignment, said ring having a gear formed on the periphery thereof, a synchronous motor, first means interconnecting said synchronous motor and said time wheels for advancing said time wheels in step-by-step motion at a predetermined time rate of advancement, and second means interconnecting said motor and the gear on said annular ring for causing step-by-step rotative movement of said annular ring at a fixed time rate of advancement.

15. In an apparatus for use in computing and recording a total charge dependent in a predetermined manner upon elapsed time, the improvement which comprises a printing head comprising a frame, a transverse shaft carried by said frame, a plurality of rotatable time wheels mounted in side-by-side relationship upon said shaft, said rotatable time wheels being effective to imprint date, hour and minute indicia on a transverse line parallel to said transverse shaft, an annular printing ring, a plate rotatably supporting said annular ring surrounding said time wheels, said ring having a shoulder on one surface thereof, raised printing indicia formed on the surface of said shoulder, a gear portion extending outwardly beyond said shoulder and being of a lesser thickness than said shoulder, a strap engaging the said gear portion for holding said ring against said plate, said indicia and time printing indicia of said time wheels being in substantial vertical alignment, a synchronous motor, first means interconnecting said synchronous motor and said time wheels for advancing said time wheels in step-by-step motion at a predetermined time rate of advancement, and second means interconnecting said motor and the gear on said annular ring for causing step-by-step rotative movement of said annular ring at a fixed time rate of advancement.

16. In an apparatus for use in computing and recording a total charge dependent in a predetermined manner upon elapsed time, a printing head comprising a frame, a transverse shaft carried by said frame, a plurality of rotatable time wheels having printing indicia formed thereon, said time wheels being mounted in side-by-side relationship upon said shaft, said rotatable time wheels being effective to imprint date, hour and minute indicia on a transverse line parallel to said transverse shaft, an annular printing ring, means engaging an external peripheral portion of said annular printing ring for rotatably supporting said annular ring surrounding said time wheels, said ring having raised printing indicia formed thereon, said last named indicia and the time printing indicia of said tme wheels being disposed in substantially the same horizontal plane, a synchronous motor mounted upon said frame, first means interconnecting said synchronous motor and said time wheels for advancing said time wheels in step-by-step movement at a predetermined time rate of advancement, and second means interconnecting said motor and said annular ring for causing step-by-step rotative movement of said annular ring at a fixed time rate of advancement.

References Cited in the file of this patent

UNITED STATES PATENTS

| | | |
|---|---|---|
| 486,458 | Ganss | Nov. 22, 1892 |
| 754,020 | Springer | Mar. 8, 1904 |
| 1,798,583 | Bishop et al. | Mar. 31, 1931 |
| 2,214,796 | Ostler | Sept. 17, 1940 |
| 2,268,924 | Cooper | Jan. 6, 1942 |